(12) United States Patent
Johnson et al.

(10) Patent No.: US 7,889,454 B2
(45) Date of Patent: Feb. 15, 2011

(54) DISTRIBUTED SERVO PATTERNS FOR DATA STORAGE MEDIA

(75) Inventors: Douglas W. Johnson, Stillwater, MN (US); James S. Anderson, Hugo, MN (US); David A. Gobran, Maplewood, MN (US); Denis J. Langlois, River Falls, WI (US)

(73) Assignee: Imation Corp., Oakdale, MN (US)

( * ) Notice: Subject to any disclaimer, the term of this patent is extended or adjusted under 35 U.S.C. 154(b) by 154 days.

(21) Appl. No.: 12/291,703

(22) Filed: Nov. 13, 2008

(65) Prior Publication Data

US 2009/0073604 A1    Mar. 19, 2009

Related U.S. Application Data

(63) Continuation of application No. 11/144,355, filed on Jun. 3, 2005, now Pat. No. 7,466,510.

(51) Int. Cl.
G11B 5/584 (2006.01)
G11B 5/09 (2006.01)

(52) U.S. Cl. ...................... 360/77.12; 360/48
(58) Field of Classification Search ........... None
See application file for complete search history.

(56) References Cited

U.S. PATENT DOCUMENTS

| | | | |
|---|---|---|---|
| 5,432,652 A | 7/1995 | Comeaux et al. |
| 5,488,525 A | 1/1996 | Adams et al. |
| 5,629,813 A | 5/1997 | Baca et al. |
| 5,689,384 A | 11/1997 | Albrecht et al. |
| 5,898,533 A | 4/1999 | Mantey et al. |
| 6,021,013 A | 2/2000 | Albrecht et al. |
| 6,023,385 A | 2/2000 | Gillingham et al. |
| 6,134,070 A | 10/2000 | Tran et al. |
| 6,166,870 A | 12/2000 | Cates et al. |
| 6,241,674 B1 | 6/2001 | Phillips et al. |
| 6,271,786 B1 | 8/2001 | Huff et al. |
| 6,312,384 B1 | 11/2001 | Chiao |
| 6,363,107 B1 | 3/2002 | Scott |
| 6,381,261 B1 | 4/2002 | Nagazumi |
| 6,385,268 B1 | 5/2002 | Fleming et al. |
| 6,400,754 B2 | 6/2002 | Fleming et al. |

(Continued)

OTHER PUBLICATIONS

"Pulse Compression Recording," Dent III et al., IEEE Transaction on Magnetics, vol. MAG-12, No. 6, Nov. 1976, pp. 743-745.

*Primary Examiner*—Andrew L Sniezek
(74) *Attorney, Agent, or Firm*—Shumaker & Sieffert

(57) ABSTRACT

The invention is directed to a data storage medium that includes a plurality of servo bands distributed across the data storage medium and a plurality of data tracks positioned between each of the plurality of distributed servo bands. The data storage medium comprises a servo band pitch of less than 200 micrometers. The large number of servo bands distributed across the data storage medium with a relatively small servo band pitch reduces the influence of media dimensional instability. In this way, the invention may substantially increase data read head positioning accuracy, especially in the case of narrow track widths. A read head array arranged in a two-dimensional matrix that includes a first servo read head, a second servo read head, and a plurality of data read heads positioned between the first and second servo read heads may be applied to a data storage medium as described herein.

10 Claims, 8 Drawing Sheets

U.S. PATENT DOCUMENTS

| | | |
|---|---|---|
| 6,462,904 B1 | 10/2002 | Albrecht et al. |
| 6,650,496 B2 | 11/2003 | Nozieres et al. |
| 6,735,039 B1 * | 5/2004 | Molstad .................. 360/77.12 |
| 7,466,510 B2 * | 12/2008 | Johnson et al. .......... 360/77.12 |
| 2001/0053174 A1 | 12/2001 | Fleming et al. |
| 2002/0093640 A1 | 7/2002 | Watanabe et al. |
| 2003/0107837 A1 | 6/2003 | Jewett et al. |
| 2004/0212915 A1 | 10/2004 | Chliwnyj et al. |
| 2004/0257689 A1 | 12/2004 | Molstad et al. |
| 2005/0099713 A1 | 5/2005 | Molstad et al. |
| 2005/0099714 A1 | 5/2005 | Yip et al. |
| 2005/0099715 A1 | 5/2005 | Yip et al. |
| 2005/0152066 A1 | 7/2005 | Yip |
| 2005/0254161 A1 | 11/2005 | Nakao |
| 2006/0291090 A1 | 12/2006 | Dugas et al. |

* cited by examiner

DISTRIBUTED SERVO PATTERNS FOR DATA STORAGE MEDIA

This application is a continuation of U.S. application Ser. No. 11/144,355, which was filed on Jun. 3, 2005, and is now U.S. Pat. No. 7,466,510, the entire content of which is incorporated herein by reference.

TECHNICAL FIELD

The invention relates to data storage media and, more particularly, magnetic storage media recorded with servo patterns.

BACKGROUND

Data storage media are commonly used for storage and retrieval of data, and come in many forms, such as magnetic tape, magnetic disks, optical tape, optical disks, holographic disks or cards, and the like. Magnetic tape media remains economical for storing large amounts of data. For example, magnetic tape cartridges, or large spools of magnetic tape, are often used to back up data in large computing centers. Magnetic tape cartridges also find application in the backup of data stored on smaller computers such as desktop or notebook computers.

In magnetic media, data is typically stored as magnetic signals that are magnetically recorded on the medium surface. The data stored on the medium is typically organized along "data tracks," and transducer heads are positioned relative to the data tracks to write data to the tracks or read data from the tracks. A typical magnetic storage medium, such as magnetic tape, typically includes several data tracks in a data band. Optical media, holographic media, and other media formats can also make use of data tracks.

Servo patterns refer to signals or other recorded marks on the medium that are used for tracking purposes. In other words, servo patterns are recorded on the medium to provide reference points relative to the data tracks. A servo controller interprets detected servo patterns and generates position error signals. The position error signals are used to adjust the lateral distance of the transducer head relative to the data tracks so that the transducer head is properly positioned along the data tracks for effective reading and/or writing of the data to the data tracks.

With some data storage media, such as magnetic tape, the servo patterns are stored in specialized tracks on the medium, called "servo tracks." Servo tracks serve as references for the servo controller. Servo tracks typically hold no data except for information that is useful to the servo controller to identify positioning of a transducer head relative to the surface of the medium. A plurality of servo tracks may be defined in a servo band. Some magnetic media include a plurality of servo bands, with data tracks being located between the servo bands.

The servo patterns recorded in the servo tracks may be sensed by one or more servo heads. For example, servo heads may be dedicated heads that read only servo patterns in the servo tracks. Alternatively, servo heads may be integrated with a read/write head. In any case, once a particular servo track is located by the servo head, one or more data tracks can be located on the medium according to the data track's known displacement from the servo track. The servo controller receives detected servo signals from the servo heads, and generates position error signals, which are used to adjust positioning of a read/write head relative to the data tracks.

SUMMARY

In general, the invention is directed to data storage media that include distributed servo bands. A data storage medium, e.g., magnetic tape, includes a plurality of servo bands distributed across the data storage medium and a plurality of data tracks positioned between each of the plurality of distributed servo bands. The data storage medium comprises a servo band pitch of less than 200 micrometers, and each servo band may include a single servo track, although the distributed servo concept could be implemented with multi-track servo bands. In any case, a large number of servo bands distributed across a data storage medium with a relatively small servo band pitch reduce the influence of media dimensional instability, such as creep or environmental changes. In this way, the invention may substantially increase data read head positioning accuracy, especially in the case of narrow data track widths.

A read head array arranged in a two-dimensional matrix that includes a first servo read head, a second servo read head, and a plurality of data read heads positioned between the first servo read head and the second servo read head may be applied to a data storage medium as described herein. In the case of narrow single track servo bands, e.g., less than 20 micrometers wide, it may be difficult for the read head array to initially find and lock onto a servo track. Therefore, each of the plurality of data read heads is capable of detecting a servo signal, such that the read head array may be initially placed anywhere on the surface of the data storage medium. In other words, the first and second servo read heads do not have to be initially positioned adjacent servo tracks on the data storage medium, as the data read heads can also detect servo signals and register the initial position of the read head array.

When the read head array of the invention is applied to the data storage medium, one of the data read heads detects a servo signal. A control unit coupled to the read head array determines an initial position of the read head array based on the detected servo signal. The control unit then calculates a distance between the initial position and a desired position. Moving the read head array by the calculated distance aligns the first and second servo read heads with first and second servo bands, respectively, and aligns the plurality of data read heads with a plurality of data tracks positioned between the first and second servo bands on the data storage medium.

In one embodiment, the invention is directed to a data storage medium comprising a first servo band, a second servo band; and a plurality of data tracks positioned between the first servo band and the second servo band, wherein a distance between the first servo band and the second servo band is less than 200 micrometers.

In another embodiment, the invention is directed to a data storage medium comprising a first servo band, a second servo band, and a plurality of data tracks positioned between the first servo band and the second servo band, wherein the first servo band and the second servo band are less than 20 micrometers wide.

In another embodiment, the invention is directed to a system comprising a read head array arranged in a two-dimensional matrix that includes a first servo read head, a second servo read head, and a plurality of data read heads positioned between the first servo read head and the second servo read head. The read head array detects a servo signal when applied to a data storage medium that includes a first servo band, a second servo band, and a plurality of data tracks positioned between the first servo band and the second servo band. The system also comprises a control unit coupled to the read head array. The control unit determines an initial position of the read head array based on the detected servo signal and moves the read head array relative to the data storage medium based on the initial position.

In another embodiment, the invention is directed to a method of reading a data storage medium that includes a first servo band, a second servo band, and a plurality of data tracks positioned between the first servo band and the second servo band. The method comprises applying a read head array to the data storage medium, the read head array including a first servo read head, a second servo read head, and a plurality of data read heads positioned between the first servo head and the second servo head, detecting a servo signal, determining an initial position of the read head array based on the detected servo signal, and moving the read head array based on the initial position such that the first servo read head and a second servo read head can detect signals from the first servo band and second servo band respectively.

The invention may be capable of providing one or more advantages. For example, distributing servo bands across a data storage medium at a relatively small servo band pitch reduces the influence of dimensional instability of the data storage medium. In a conventional magnetic tape with a servo band pitch of approximately 3000 μm, even a 0.1% media width change will result in a 3 μm track mis-registration. With tracks on the order of 10 μm or less, this becomes at least 30% of a track width and easily can cause off-track data errors. In a magnetic tape of the invention with a servo band pitch of approximately 200 μm, a 0.1% media width change will result in a 0.2 μm track mis-registration. With data tracks on the order of 10 μm or less, this becomes only 2% of a data track width, which substantially reduces the possibility of off-track data errors.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
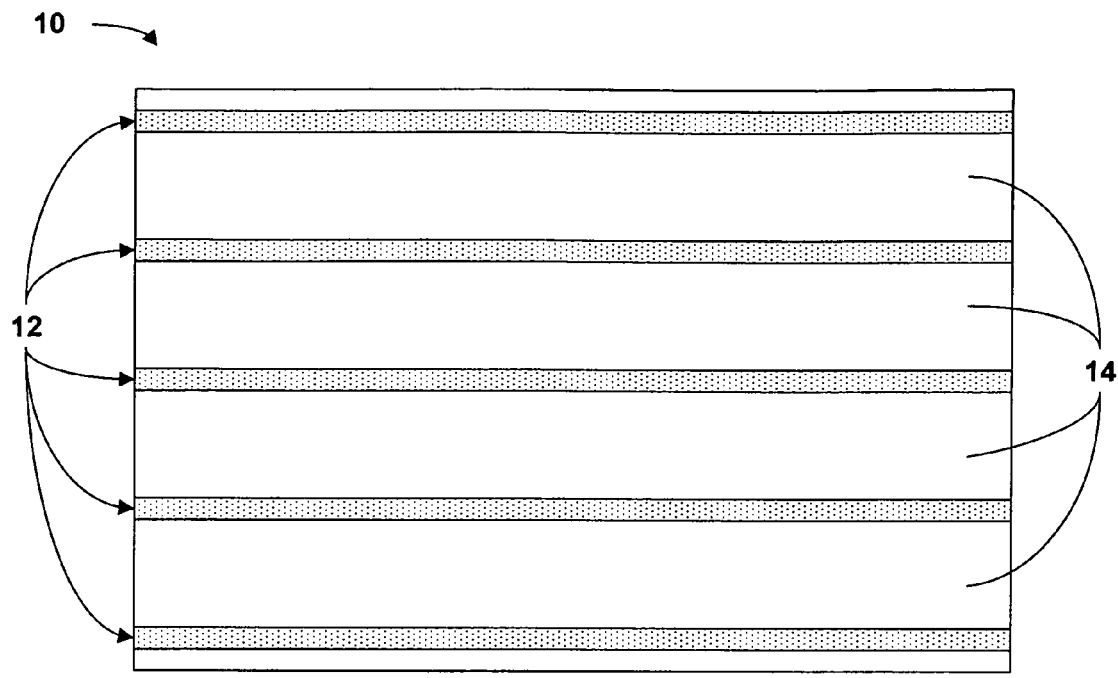
FIG. 1 is a depiction of a prior art magnetic tape.

FIG. 1 is a depiction of a prior art magnetic tape 10. In the illustrated embodiment, magnetic tape 10 has a width of approximately 12.7 mm (0.5 inch) and comprises five servo bands 12 and four data bands 14 positioned between each of servo bands 12. Each of servo bands 12 may be approximately 200 μm wide and include a plurality of servo tracks. Each of data bands 14 may be approximately 3000 μm wide and include a plurality of data tracks. Each of the plurality of data tracks may be less than 10 μm wide such that at least 300 data tracks may be included within one of data bands 14.

Servo bands 12 typically hold no data except for information that is useful in positioning a data read/write head relative to data bands 14. For example, one of servo bands 12 may provide positioning information for a plurality of data tracks within one of data bands 14. Each of the plurality of servo tracks within servo bands 12 may provide positioning information for one or more of the plurality of data tracks within data bands 14.

A conventional read/write head structure may include a servo read head and at least one data read/write head. It is within the mechanical tolerances of a conventional read/write head system to locate the servo read head within the relatively wide servo band 12 when the data read/write head structure is applied to magnetic tape 10. Once the servo read head is located within one of servo bands 12, the servo read head may be positioned adjacent a particular servo track based on position error signals calculated from detected servo signals. In the case of a data write head, the plurality of data tracks within each of data bands 14 may be written in a serpentine fashion as the servo read head steps across the plurality of servo tracks within each of servo bands 12. In the case of a data read head, the servo read head may be positioned adjacent a specific servo track in order to retrieve data stored on one or more corresponding data tracks.

In order to increase data storage capacity of magnetic tape 10, the number of data tracks within data bands 14 may be increased, and the number of servo tracks may be likewise increased. However, as the number of data and servo tracks increases, the tracks usually become narrower and more crowded on the surface of magnetic tape 10.

The servo arrangement illustrated in FIG. 1 is susceptible to the influence of the dimensional instability of magnetic tape 10. Magnetic tape 10 may become distorted due to creep, i.e., constant stress at elevated temperatures, or environmental changes, e.g., temperature and humidity. In accordance with the prior art, the distance between servo bands, or servo band pitch, is approximately 3000 μm. This relatively large servo band pitch does not easily support narrow track widths when magnetic tape 10 is dimensionally instable. For example, with a 3000 μm servo band pitch, even a 0.1% media width change will result in a 3 μm data track mis-registration. With data tracks on the order of 10 μm or less, this becomes at least 30% of a data track width and easily can cause off-track data errors.

Figure 2:
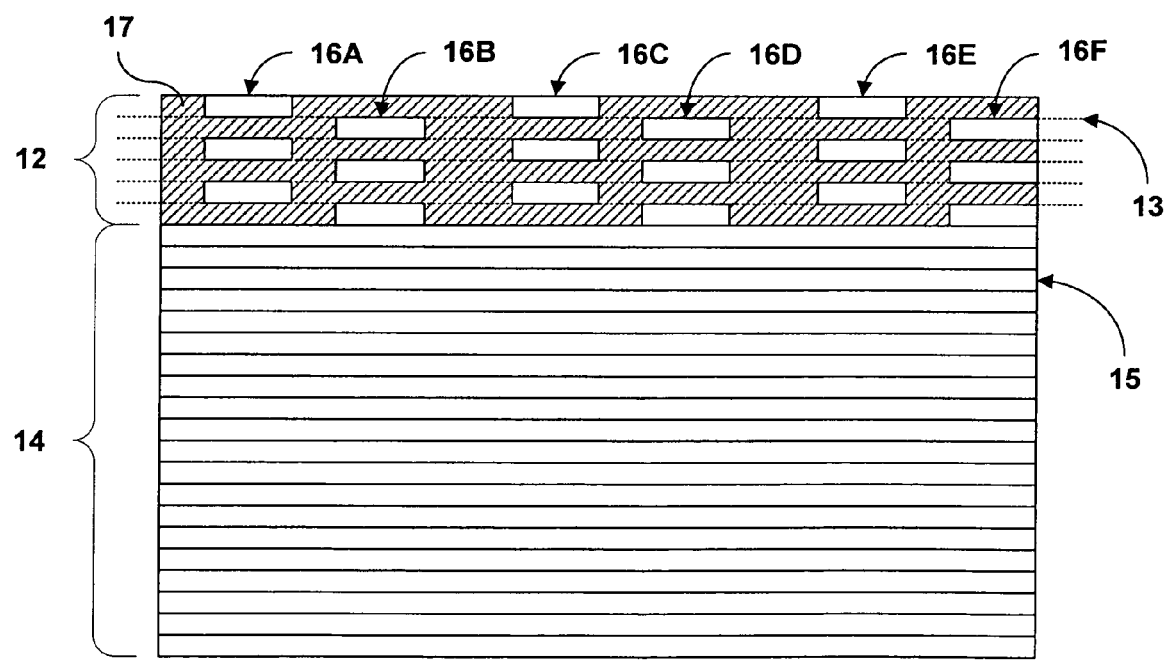
FIG. 2 is a depiction of a portion of a prior art magnetic tape in greater detail.

FIG. 2 is a depiction of a portion of prior art magnetic tape 10 in greater detail. In the illustrated embodiment, a portion of one of servo bands 12 includes five servo tracks and a servo pattern. A portion of one of data bands 14 includes a plurality of data tracks, such as data track 15. Each of the servo tracks may reside a known distance from a corresponding data track or set of data tracks.

The servo pattern included in servo band 12 comprises a single frequency amplitude-based servo pattern. The single frequency amplitude-based servo pattern includes a number of servo windows arranged in a checkerboard-like pattern. The servo windows may comprise areas where a previously recorded magnetic signal 17 has been erased from magnetic tape 10. For example, along servo track 13, servo band 12 comprises servo windows 16A-16F ("servo windows 16").

The servo pattern can be written by passing magnetic tape 10 under gaps of a servo write head (not shown). A relatively wide gap in the servo head can be used to record magnetic signal 17 having a given frequency on the surface of magnetic tape 10. A servo write head (or a separate erase head) having a relatively small write gap track width in the direction transverse to the servo track direction can be used to create erased servo windows 16 along servo track 13, for example. In the illustrated embodiment, erased servo windows 16 form a checkerboard-like configuration that enables a servo read head to pinpoint the location of servo track 13.

A corresponding data track, e.g., data track 15, is located at a defined displacement from servo track 13. Therefore, a data read/write head structure may be designed such that when the servo read head is precisely on-track with servo track 13, a data read/write head is precisely on-track with corresponding data track 15. However, the dimensional instability of magnetic tape 10 may cause mis-registration of the data read/write head with corresponding data track 15. For example, magnetic tape 10 may shrink in width due to creep or environmental changes. Even a slight dimensional change in the relatively wide data band 14 may cause large dimensional changes in the relatively narrow data tracks. This may alter the defined displacement of data track 15 from corresponding servo track 13, which results in substantial errors when positioning the data read/write head adjacent data track 15. As data tracks become narrower, this problem manifests more significantly.

The invention is directed to a data storage medium, e.g., magnetic tape, that includes distributed servo bands. The data storage medium may comprise a number of single track servo bands distributed across the medium at servo band pitches significantly less than those of conventional media, although the distributed servo concepts could also apply to multi-track servo bands. For example, magnetic tape may include a plurality of single track servo bands distributed across the data storage medium and a plurality of data tracks positioned between each of the plurality of distributed servo bands. The magnetic tape comprises a servo band pitch of less than 200 µm. The large number of servo bands distributed across the magnetic tape with a relatively small servo band pitch reduces the influence of media dimensional instability, such as creep or environmental changes. In this way, the invention may substantially increase data read/write head positioning accuracy, especially in the case of narrow data track widths.

Figure 3:
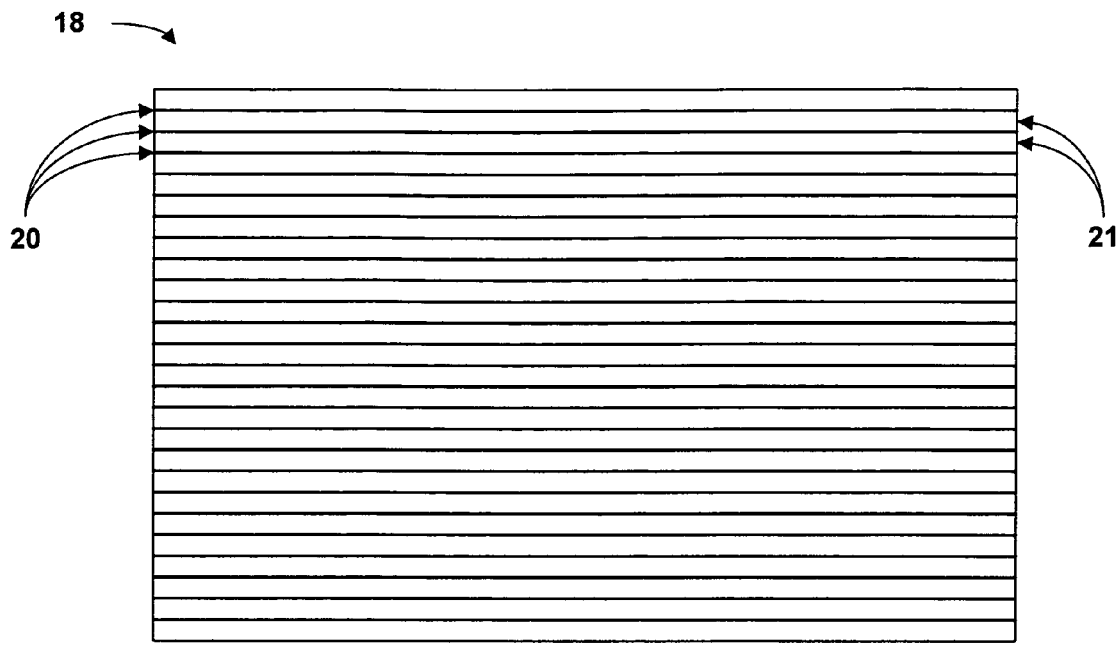
FIG. 3 is a depiction of a magnetic tape that includes distributed servo bands.

FIG. 3 is a depiction of a magnetic tape 18 that includes distributed servo tracks 20. Contrary to conventional magnetic tape, as described above, servo tracks 20 are not disposed adjacent one another to define a multi-track servo band. Instead, individual servo tracks 20 are disposed across an entire width of magnetic tape 18 and separated from each other by data bands 21. In this sense, each of servo tracks 20 are also servo bands, i.e., single track servo bands. Importantly, magnetic tape 18 comprises a servo band pitch of less than 200 µm, which is also a servo track pitch when the bands each include a single track. Two of servo tracks 20 adjacent to any one of data bands 21 provide positioning information for that data band.

In the illustrated embodiment, magnetic tape 18 has a width of approximately 12.7 mm (0.5 inch) and comprises approximately seventy-five servo tracks 20 and approximately seventy-four data bands 21 positioned between each of servo tracks 20. In other embodiments, magnetic tape 18 may comprise any number of servo tracks 20 and data bands 21. Each of servo tracks 20 may be less than 20 µm wide, and more preferably less than 10 µm wide. Each of data bands 21 may be less than 200 µm wide and include a plurality of data tracks. For example, each of data bands 21 may include approximately thirty-two data tracks that are each approximately 5 µm wide. In general, the invention may limit the distance between successive servo bands. The servo bands are not necessarily single-track bands, although single track servo bands are preferred for distributed amplitude-based servo.

In order to accurately position a data read/write head adjacent each of the relatively narrow data tracks, a read/write head array may be used that includes a first servo read head, a second servo read head and a plurality of data read/write heads. For example, the read/write head array may be arranged in a two-dimensional matrix to simultaneously read or write the plurality of data tracks within one of data bands 21 during a single pass. The first and second servo read heads are located on two of servo tracks 20 adjacent the one of data bands 21 to provide positioning information to the read/write head array. Thus, the servo heads are the outermost heads of a read/write head array.

When servo tracks 20 are relatively narrow, such as those disclosed herein, it may be outside of the mechanical tolerances of a read head system to locate the first and second servo read heads on the servo tracks 20 when the read head array is initially applied to magnetic tape 18. However, the invention allows the read head array to be initially located anywhere on magnetic tape 18 and data read heads can detect the servo signal to provide information for coarse head alignment. The array can then be positioned such that the first servo head aligns with a first one of servo tracks 20, the second servo head aligns with a second one of servo tracks 20, and the plurality of data read heads aligns with the plurality of data tracks within the one of data bands 21 adjacent the first and second servo tracks. Once the first and second servo read heads are aligned with two of the servo tracks 20, the read head array may be more accurately positioned based on position error signals calculated from detected servo signals.

As described above, track positioning accuracy can be substantially reduced due to dimensional changes of conventional magnetic tape, especially in the case of relatively narrow data tracks. The servo arrangement illustrated in FIG. 3 has a relatively small servo band pitch of less than 200 µm. Therefore, the dimensional instability of magnetic tape 18 due to creep or environmental change is less significant. The relatively small servo band pitch allows accurate positioning of a read head array adjacent narrow data tracks even when magnetic tape 18 is dimensionally instable. For example, with a 200 µm servo band pitch, a 0.1% media width change will result in a 0.2 µm track mis-registration. With data tracks on the order of 10 µm or less, this becomes only 2% of a data track width, which substantially reduces the possibility of off-track data errors.

Figure 4:
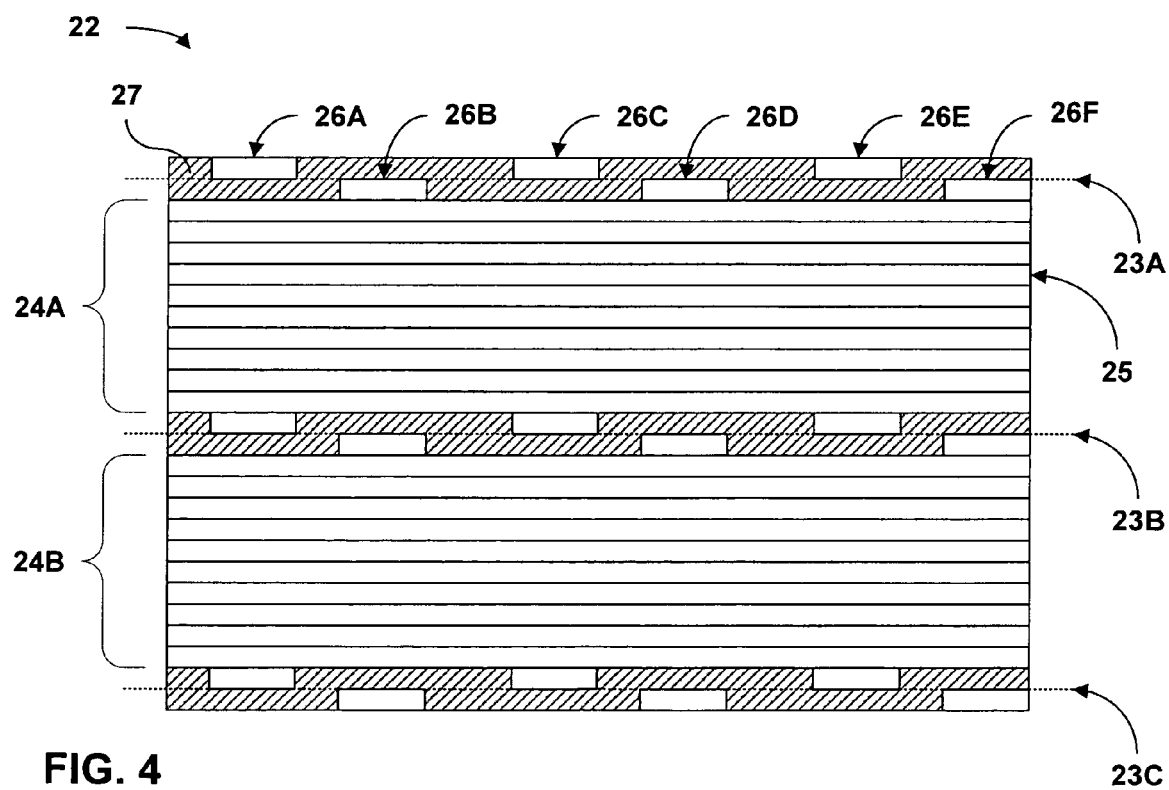
FIG. 4 is a depiction of a portion of an exemplary magnetic tape in accordance with an embodiment of the invention.

FIG. 4 is a depiction of a portion of an exemplary magnetic tape 22 in accordance with an embodiment of the invention. Magnetic tape 22 includes a plurality of servo tracks distributed across an entire width of magnetic tape 22 with data bands positioned between each of the servo tracks, substantially similar to magnetic tape 18. In the illustrated embodiment, magnetic tape 22 comprises a single-frequency amplitude based servo pattern.

Magnetic tape 22 includes a first servo track 23A, a second servo track 23B, and a third servo track 23C (collectively "servo tracks 23") distributed across the portion of magnetic tape 22. Each of servo tracks 23 are recorded in single track servo bands that are less than 20 µm wide, and more preferably less than 10 µm wide. As can be seen, servo tracks 23 are collectively analogous to a conventional multi-track servo band, illustrated in FIG. 2, but are separated into single-track servo bands that are positioned across magnetic tape 22 with a servo band pitch of less than 200 μm. In this way, magnetic tape 22 is less vulnerable to the influence of media deformation due to creep or environmental change.

Magnetic tape 22 also includes a first data band 24A positioned between first servo track 23A and second servo track 23B. A second data band 24B is positioned between second servo track 23B and third servo track 23C. Each of first and second data bands 24A and 24B ("data bands 24") include a plurality of data tracks, such as data track 25. Data bands 24 may include any number of data tracks. For example, data band 24A may comprise thirty-two data tracks, each approximately 5 μm wide. In this case, data band 24A is then less than 200 μm wide. First servo track 23A and second servo track 23B provide positioning information for each of the data tracks within first data band 24A. In addition, second servo track 23B and third servo track 23C provide positioning information for each of the data tracks within second data band 24B. Thus, the same servo track 23B is used for positioning of two adjacent bands, but is used in conjunction with a different servo track depending upon which data band is being read.

The servo pattern included in first servo track 23A comprises a single frequency amplitude-based servo pattern. The single frequency amplitude-based servo pattern includes a number of servo windows 26A-26F ("servo windows 26") arranged in a checkerboard-like pattern that enables a servo read head to pinpoint the location of servo track 23A. The servo windows may comprise areas where a previously recorded magnetic signal 27 has been erased from magnetic tape 22.

As described above, a read head array arranged in a two-dimensional matrix that includes a first servo read head, a second servo read head and a plurality of data read heads between the servo heads may be used to simultaneously read the plurality of data tracks within one of data bands 24 during a single pass. The plurality of data tracks within data band 24A, for example, are each located at a defined displacement from servo track 23A. Therefore, the read head array may be designed such that when the first servo read head is precisely on-track with first servo track 23A and the second servo read head is precisely on-track with second servo track 23B, each of the plurality of data read heads is precisely on-track with one of the plurality of data tracks within data band 24. Once the first and second servo read heads of the read head array are properly aligned with first servo track 23A and second servo track 23B, respectively, the servo read heads use the single frequency amplitude-based servo pattern to fine position the read head array.

The reduced servo band pitch allows the read head array to properly align with first and second servo tracks, 23A and 23B, and the plurality of data tracks within data band 24A even when magnetic tape 22 experiences dimensional instability. For example, magnetic tape 22 may shrink or expand due to creep or environmental changes. A slight dimensional change in the relatively narrow data bands 24 cause substantially insignificant dimensional changes in the relatively narrow data tracks. Therefore, the relatively narrow servo band pitch of less than 200 μm substantially reduces the influence of media dimensional changes on data track alignment relative to conventional servo arrangements.

Figure 5:
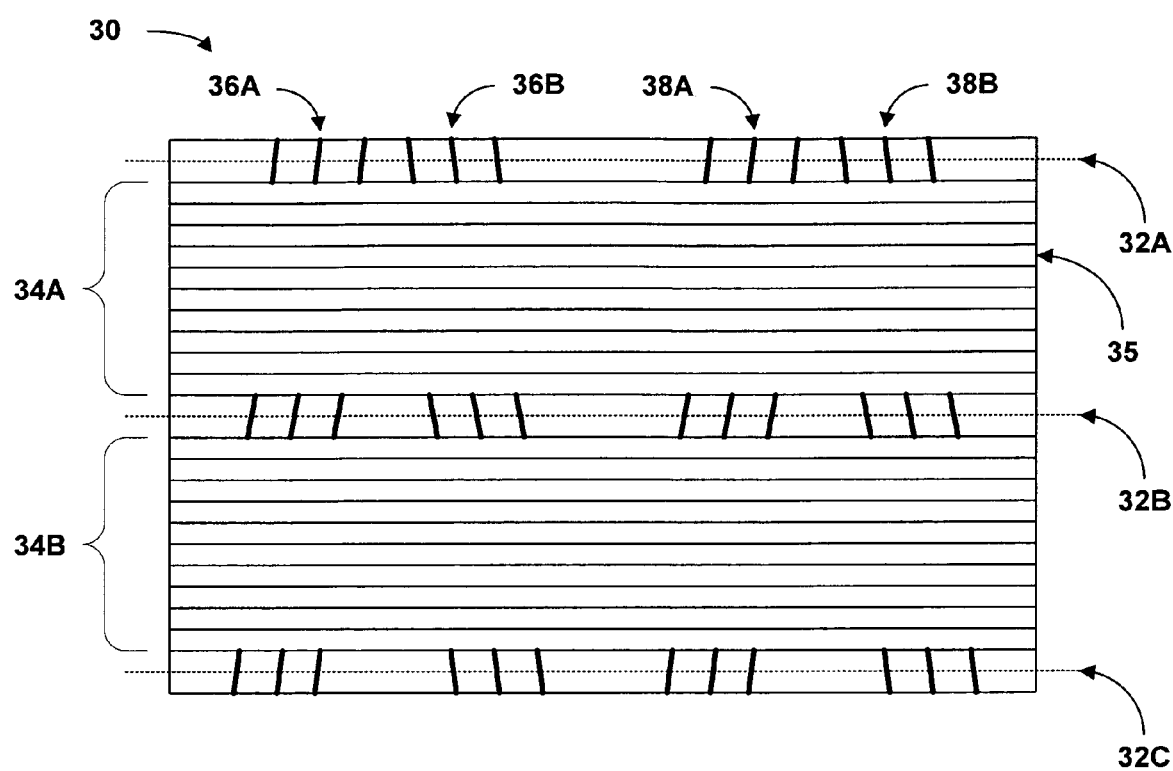
FIG. 5 is a depiction of a portion of another exemplary magnetic tape in accordance with an embodiment of the invention.

FIG. 5 is a depiction of a portion of an exemplary magnetic tape 30 in accordance with an embodiment of the invention. Magnetic tape 30 includes a plurality of servo bands distributed across an entire width of magnetic tape 30 with data bands positioned between each of the servo bands. In the illustrated embodiment, magnetic tape 30 comprises a time-based servo pattern.

In the illustrated embodiment, magnetic tape 30 includes a first servo band 32A, a second servo band 32B, and a third servo band 32C (collectively "servo bands 32") distributed across the portion of magnetic tape 30. Each of servo bands 32 are less than 20 μm wide, and more preferably less than 10 μm wide. Servo bands 32 define a servo band pitch of less than 200 μm. In this way, magnetic tape 30 is less vulnerable to the influence of media deformation due to creep or environmental change. In this example, servo bands 32 are single track servo bands that include one servo track per servo band.

Magnetic tape 30 also includes a first data band 34A positioned between first servo band 32A and second servo band 32B. A second data band 34B is positioned between second servo band 32B and third servo band 32C. Each of first and second data bands 34A and 34B ("data bands 34") include a plurality of data tracks, such as data track 35. Data bands 34 may include any number of data tracks. For example, data band 34A may comprise thirty-two data tracks, each approximately 5 μm wide. In this case, data band 34A is then less than 200 μm wide. First servo band 32A and second servo band 32B provide positioning information for each of the data tracks within first data band 34A. In addition, second servo band 32B and third servo band 32C provide positioning information for each of the data tracks within second data band 34B.

The servo pattern included in first servo band 32A (and other servo bands) comprises a time-based servo pattern. The time-based servo pattern includes a first set of servo marks 36A and a second set of servo marks 36B ("servo marks 36") and a first set of servo marks 38A and a second set of servo marks 38B ("servo marks 38") arranged in a "/// \\\" pattern. In other embodiments, the time-based servo marks 36 and 38 may be arranged in different patterns such as a "<<< >>>" pattern or a "|\|" pattern. Servo marks 36 and 38 may comprise magnetic transitions on magnetic tape 30. A designated time period between detecting first sets of servo marks 36A and 38B and detecting second sets of servo marks 36B and 38B, as the tape moves at a constant velocity enables a servo read head to pinpoint the location of servo band 32A. Ratios may be used to eliminate problems due to velocity changes in the tape.

A read head array, as described above, may be applied to magnetic tape 30 to simultaneously read the plurality of data tracks within one of data bands 34 during a single pass. Once the first and second servo read heads of the read head array are properly aligned with first servo band 32A and second servo band 32B, respectively, the servo read heads use the time-based servo pattern to fine position the read head array. The reduced servo band pitch allows the read head array to properly align with first and second servo bands, 32A and 32B, and the plurality of data tracks within data band 34A even when magnetic tape 30 experiences dimensional instability. Notably, relative to a conventional time-based servo pattern, the pattern used on magnetic tape 30 is broken into different bands and distributed across magnetic tape 30. Thus the marks in the different bands are not identical, but would form long continuous lines if the same servo bands were placed immediately adjacent one another.

Figure 6:
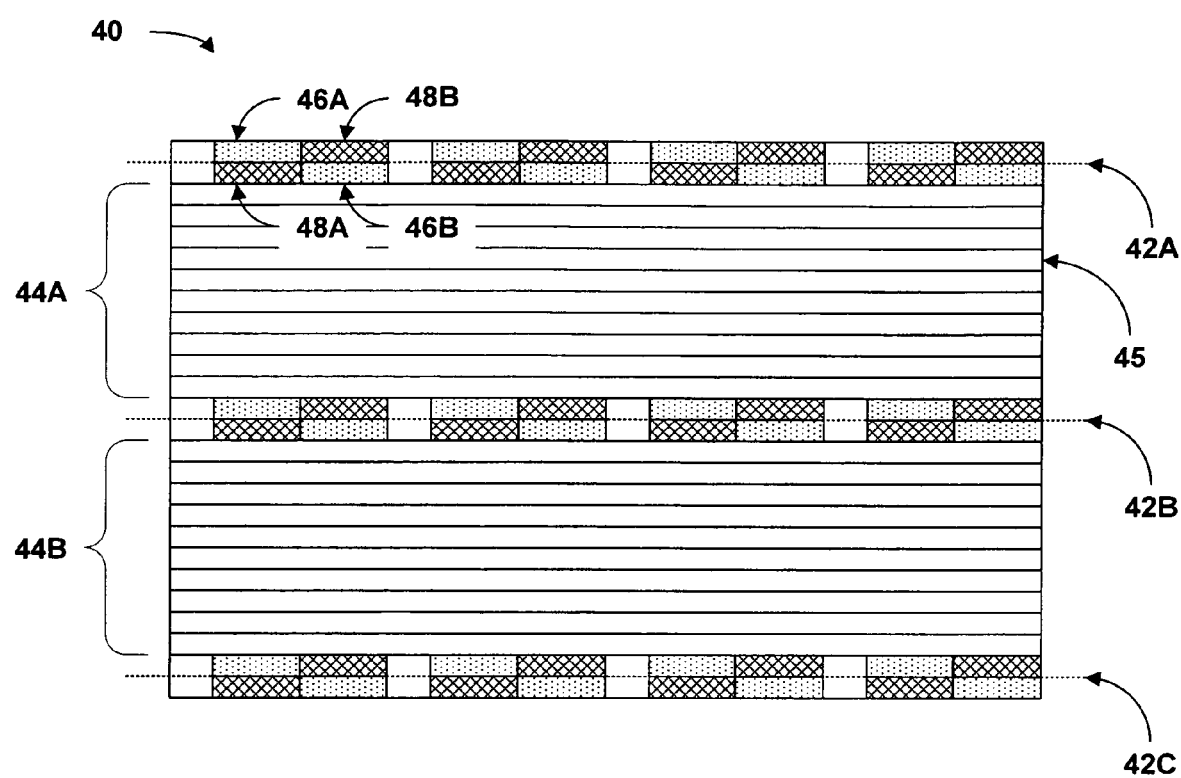
FIG. 6 is a depiction of a portion of another exemplary magnetic tape in accordance with an embodiment of the invention.

FIG. 6 is a depiction of a portion of an exemplary magnetic tape 40 in accordance with an embodiment of the invention. Magnetic tape 40 includes a plurality of servo bands distributed across an entire width of magnetic tape 40 with data bands positioned between each of the servo bands. In the embodiment illustrated in FIG. 6, magnetic tape 40 comprises a mixed frequency amplitude-based servo pattern.

In particular, magnetic tape 40 includes a first servo band 42A, a second servo band 42B, and a third servo band 42C (collectively "servo bands 42") distributed across the portion of magnetic tape 40. Each of servo bands 42 are less than 20 µm wide, and more preferably less than 10 µm wide. Servo bands 42 define a servo band pitch of less than 200 µm. In this way, magnetic tape 40 is less vulnerable to the influence of media deformation due to creep or environmental change. In this example, servo bands 42 are single track servo bands that include one servo track per servo band.

Magnetic tape 40 also includes a first data band 44A positioned between first servo band 42A and second servo band 42B. A second data band 44B is positioned between second servo band 42B and third servo band 42C. Each of first and second data bands 44A and 44B ("data bands 44") include a plurality of data tracks, such as data track 45. Data bands 44 may include any number of data tracks. For example, data band 44A may comprise thirty-two data tracks, each approximately 5 µm wide. In this case, data band 44A is then less than 200 µm wide. First servo band 42A and second servo band 42B provide positioning information for each of the data tracks within first data band 44A. In addition, second servo band 42B and third servo band 42C provide positioning information for each of the data tracks within second data band 44B.

The servo pattern included in first servo band 42A (and other servo bands) comprises a mixed frequency amplitude-based servo pattern. The mixed frequency amplitude-based servo pattern includes a set of first servo windows 46A and 46B ("first servo windows 46") recorded at a first frequency. The servo pattern also includes a set of second servo windows 48A and 48B ("second servo windows 48") recorded at a second frequency. In other words the windows are defined by periodic signals, but the frequency is different for the different sets of servo windows. The set of first servo windows 46 and the set of second servo windows 48 are arranged in a checkerboard-like pattern that enables a servo read head to pinpoint the location of servo band 42A. A mixed frequency amplitude-based servo pattern provides improved redundancy relative to other servo patterns. For example, each of the different sets of windows may allow for the generation of different PES signals by filtering the respective signals from an overall signal. The different PES signals can then be averaged to generate an overall PES. While the detected windows may each be susceptible to dropout, the ratio of signals detected from such windows may remain useful even if a dropout is present, making the servo pattern more robust and redundant than conventional patterns.

A read head array, as described above, may be applied to magnetic tape 40 to simultaneously read the plurality of data tracks within one of data bands 44 during a single pass. Once the first and second servo read heads of the read head array are properly aligned with first servo band 42A and second servo band 42B, respectively, the servo read heads use the mixed frequency amplitude-based servo pattern to fine position the read head array. The reduced servo band pitch allows the read head array to properly align with first and second servo bands, 42A and 42B, and the plurality of data tracks within data band 44A even when magnetic tape 40 experiences dimensional instability.

Figure 7:
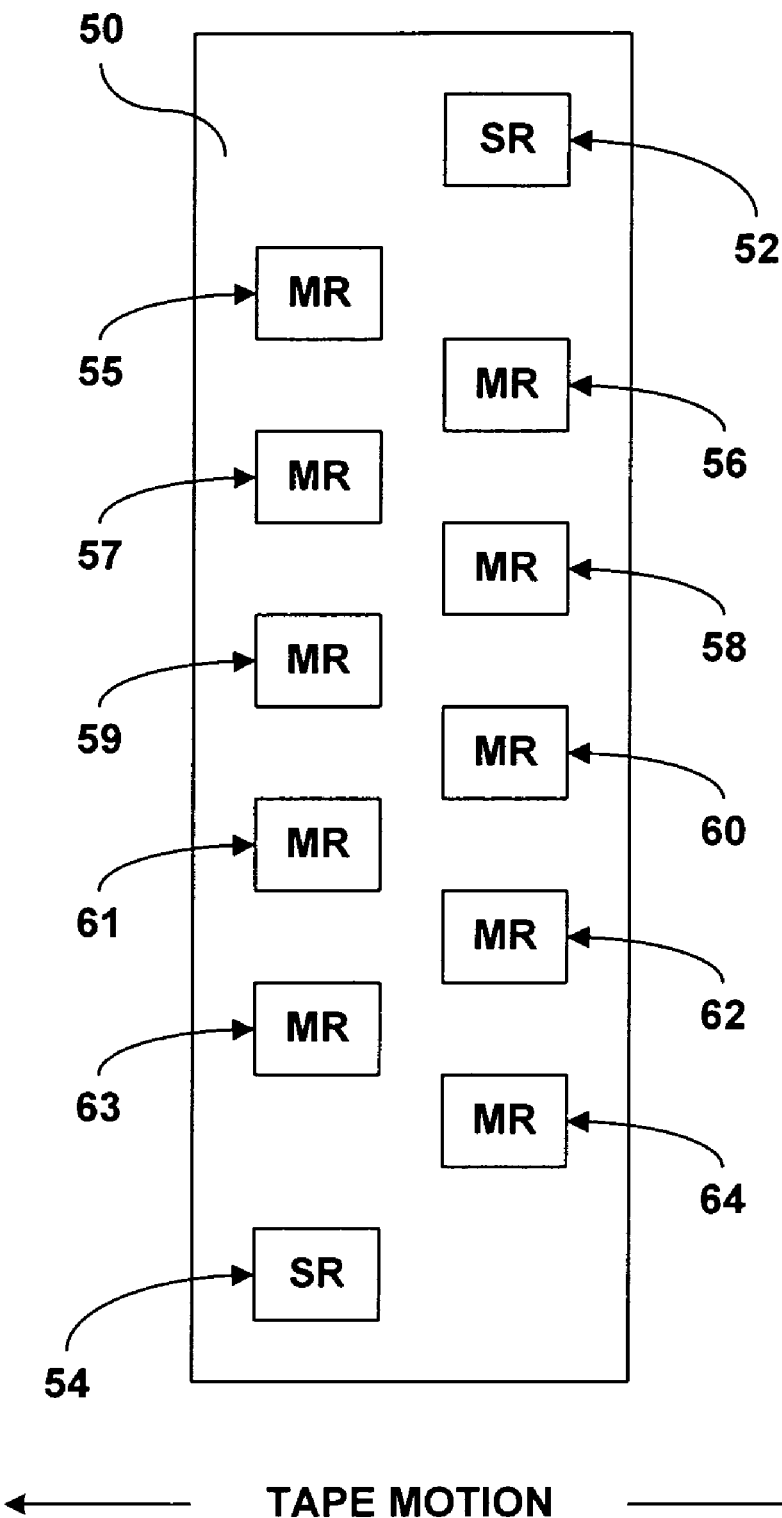
FIG. 7 is a top view of an exemplary read head array capable of reading data recorded on a magnetic tape with distributed servo bands.

FIG. 7 is a top view of an exemplary read head array 50 capable of reading data recorded on a magnetic tape with distributed servo bands. For example, read head array 50 may be applied to a magnetic tape that includes a first servo band, a second servo band, and a plurality of data tracks positioned between the first servo band and the second servo band, substantially similar to magnetic tape 40 of FIG. 6.

Read head array 50 comprises a first servo read (SR) head 52, a second SR head 54, and a plurality of data read heads 55-64 positioned between first SR head 52 and second SR head 54. In the illustrated embodiment, each of the SR heads 52, 54 and data read heads 55-64 comprises a magnetoresistive (MR) head. Read head array 50 is designed such that when first SR head 52 is precisely on-track with a first servo band on a magnetic tape and second SR head 54 is precisely on-track with a second servo band on the magnetic tape, each of the plurality of data read heads 55-64 is precisely on-track with one of a plurality of data tracks positioned between the first and second servo bands.

The SR heads 52 and 54 and the data read heads 55-64 are arranged in a two-dimensional matrix on read head array 50 in order to operate at relatively narrow track widths. Accordingly, the invention can facilitate increased storage densities on magnetic media, and is particularly useful for increasing the storage densities of magnetic tape. For example, SR heads 52 and 54 may align with servo bands on the magnetic tape that have widths of less than 20 µm and, more preferably, less than 10 µm and define a servo band pitch of less than 200 µm. Data read heads 55-64 may align with data tracks on the magnetic tape that have widths of approximately 5 µm and a data track pitch less than the width of the servo bands.

Read head array 50 may be initially placed at any position on the magnetic tape. The design of read head array 50 ensures that at least one of first servo read head 54, second servo read head 56, and data read heads 55-64 are positioned adjacent a servo band. Each of data read heads 55-64 are capable of detecting the presence or absence of a servo signal. For example, data read heads 55-64 may be capable of detecting either a specific frequency or an erased servo window included in a single frequency amplitude-based servo pattern, as described in FIG. 4. In other cases, data read heads 55-64 may be capable of detecting one of the frequencies or a synchronization region in a mixed frequency amplitude-based servo signal, as described in FIG. 6.

Read head array 50 spans the servo band pitch such that at least one of data read heads 55-64 is adjacent the servo pattern on one of the servo bands. In other words, read head array 50 is slightly larger than the servo band pitch. The one of the data read heads 55-64 that detects the servo signal defines an initial position of read head array 50. Read head array 50 is then moved based on the initial position to align first SR head 52 with a first servo band and align second SR head 54 with a second servo band. By aligning first SR head 52 and second SR head 54, each of data read heads 55-64 align with each of the plurality of data tracks between the first servo band and the second servo band.

Figure 8:
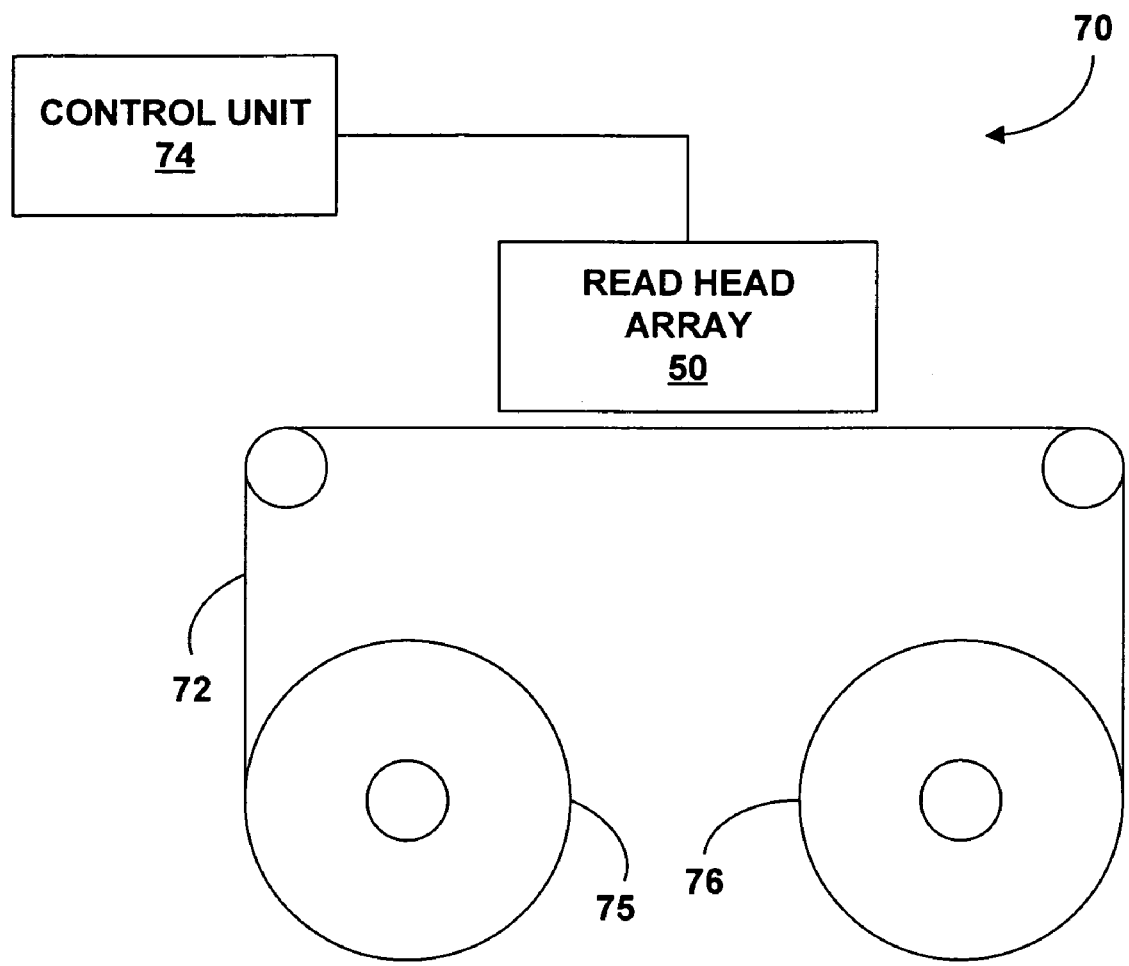
FIG. 8 illustrates a read head array in an exemplary read head system.

FIG. 8 illustrates read head array 50 in an exemplary read head system 70. Read head system 70 includes read head array 50, a control unit 74, and a magnetic tape 72 spooled on spools 75 and 76. As described above, read head array 50 includes first SR head 52, second SR head 54, and the plurality of data read heads 55-64. Magnetic tape 72 feeds from spool 75 to spool 76, passing in close proximity to read head array 50. Read head array 50 reads data recorded on magnetic tape 72. Magnetic tape 72 may include a first servo band, a second servo band, and a plurality of data tracks positioned between the first and second servo bands, as described herein.

When servo bands are relatively narrow, such as those disclosed herein, it may be outside of the mechanical tolerances of read head system 70 to locate first and second SR heads 52, 54 on the first and second servo bands when read head array 50 is initially applied to magnetic tape 72. In order to allow read head array 50 to be initially placed at any position on magnetic tape 72, each of the plurality of data read heads 55-64 on read head array 50 is capable of detecting a servo signal from one of the servo bands on magnetic tape 72.

In some cases, each of the plurality of data read heads 55-64 may flag either the presence of a servo signal or the absence of a servo signal.

Read head array 50 spans the servo band pitch of magnetic tape 72 such that a servo signal can be detected by one of data read heads 55-64 regardless of an initial position of read head array 50. The distance between each of data read heads 55-64 on read head array 50 is less than the width of the servo bands on magnetic tape 72 to ensure that at least one of the plurality of data read heads 55-64 is adjacent the servo pattern of the servo bands.

Control unit 74 determines an initial position of the read head array relative to the first servo band on the magnetic tape based on the one of data read heads 55-64 that detects the servo signal. Control unit 74 then calculates a distance between the initial position and a desired position. The desired position of read head array 50 aligns first SR head 52 with the first servo band on the magnetic tape and aligns second SR head 54 with the second servo band on the magnetic tape. Control unit 74 moves read head array 50 based on the calculated distance. This initial positioning is relatively coarse positioning that gets SR heads 52 and 54 positioned over the servo bands.

Once first and second SR heads 54, 56 are properly aligned with the first and second servo bands, respectively, control unit 74 may more accurately position read head array 50 based on position error signals calculated from servo signals detected by SR heads 54 and 56. Control unit 74 then locks read head array 50 in position.

Figure 9A:
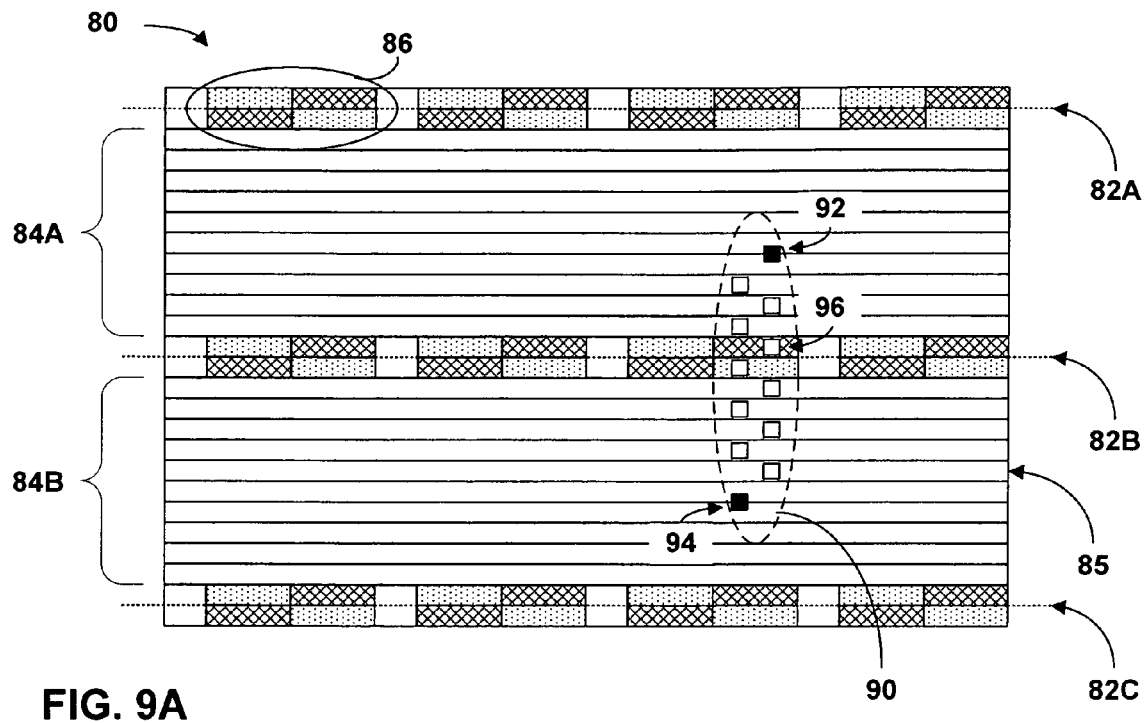
FIGS. 9A and 9B illustrate an exemplary read head array applied to a portion of a magnetic tape.
Figure 9B:
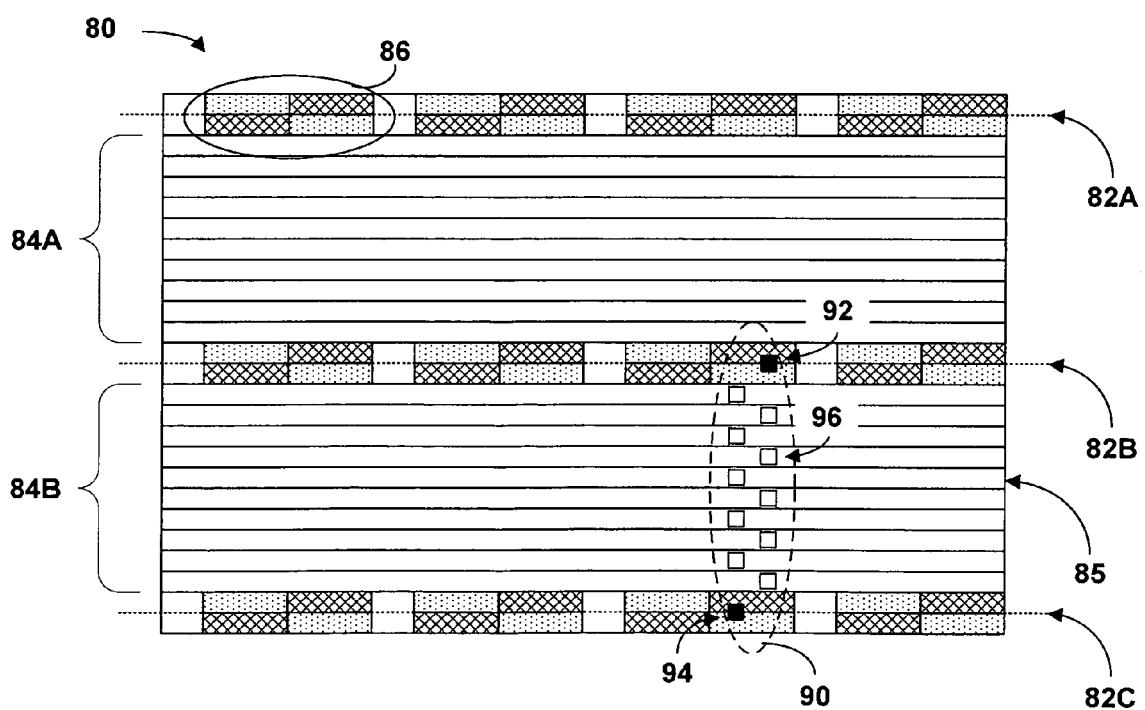

FIGS. 9A and 9B illustrate an exemplary read head array 90 applied to a portion of a magnetic tape 80. Magnetic tape 80 includes a first servo band 82A, a second servo band 82B, and a third servo band 82C ("servo bands 82") distributed across a width of the magnetic tape. Magnetic tape 80 also includes a first data band 84A positioned between first servo band 82A and second servo band 82B. A second data band 84B is positioned between second servo band 82B and third servo band 82C. Each of first and second data bands 84A and 84B ("data bands 84") include a plurality of data tracks, such as data track 85. In this example, servo bands 82 are single track servo bands that include one servo track per servo band.

Substantially similar to magnetic tape 40 illustrated in FIG. 6, magnetic tape 80 comprises servo bands 82 less than 20 μm wide, and more preferably less than 10 μm wide with servo band pitches less than 200 μm. In this way, magnetic tape 80 is less vulnerable to the influence of media deformation due to creep or environmental change. Magnetic tape 80 also comprises data bands 84 that each may comprise thirty-two data tracks that are each approximately 5 μm wide.

Servo bands 82 include sets of mixed frequency amplitude-based servo windows 86. As illustrated, the sets of mixed frequency servo windows 86 repeat to define successive servo frames along the length of magnetic tape 80. The sets of mixed frequency amplitude-based servo windows include a set of first servo windows recorded at a first frequency and a set of second servo windows recorded at a second frequency.

As illustrated in FIG. 9A, servo read head 90 is placed adjacent magnetic tape 80 at any location. Read head array 90 includes a first servo read head 92, a second servo read head 94, and a data read head for each of the data tracks within data bands 84. Each of the data read heads is capable of detecting a servo signal from servo bands 82. In the embodiment illustrated in FIGS. 9A and 9B, the data read heads are capable of detecting one of the frequencies in the sets of mixed frequency servo windows 86 such that data read head 96 detects the servo signal.

A control unit (not shown) coupled to read head array 90, receives the detected servo signal from data read head 96. The control unit determines an initial position of read head array 90 relative to second servo band 82B on magnetic tape 80 based on data read head 96 that detects the servo signal. The control unit then calculates a distance between the initial position of read head array 90 and a desired location of read head array 90. The desired location of read head array 90 coarsely aligns first servo read head 92 with second servo band 82B and coarsely aligns second servo read head 94 with third servo band 82C. When first and second servo read heads 92 and 94 are coarsely aligned with servo bands 82B and 82C, respectively, the plurality of data read heads coarsely align with the plurality of data tracks within data band 84B.

As illustrated in FIG. 9B, the control unit coupled to read head array 90 moves read head array 90 based on the calculated distance to the desired position. The servo arrangement illustrated in FIGS. 9A and 9B has a relatively small servo band pitch of less than 200 μm, and each servo band is a single track band. Problems due to dimensional instability of magnetic tape 80 are substantially insignificant. In particular, the relatively small servo band pitch allows accurate positioning of read head array 90 adjacent the narrow data tracks even when magnetic tape 80 is dimensionally instable.

Once read head array 90 is located at the desired position, first and second servo read heads 92, 94 detect servo signals from second servo band 82B and third servo band 82C. Control unit 74 may more accurately position read head array 90 based on position error signals calculated from the detected servo signals. Control unit 74 then locks first servo read head 92 onto second servo band 82B and locks second servo read head 94 onto third servo band 82C. Servo band identification then establishes which of data bands 84 has been acquired.

Figure 10:
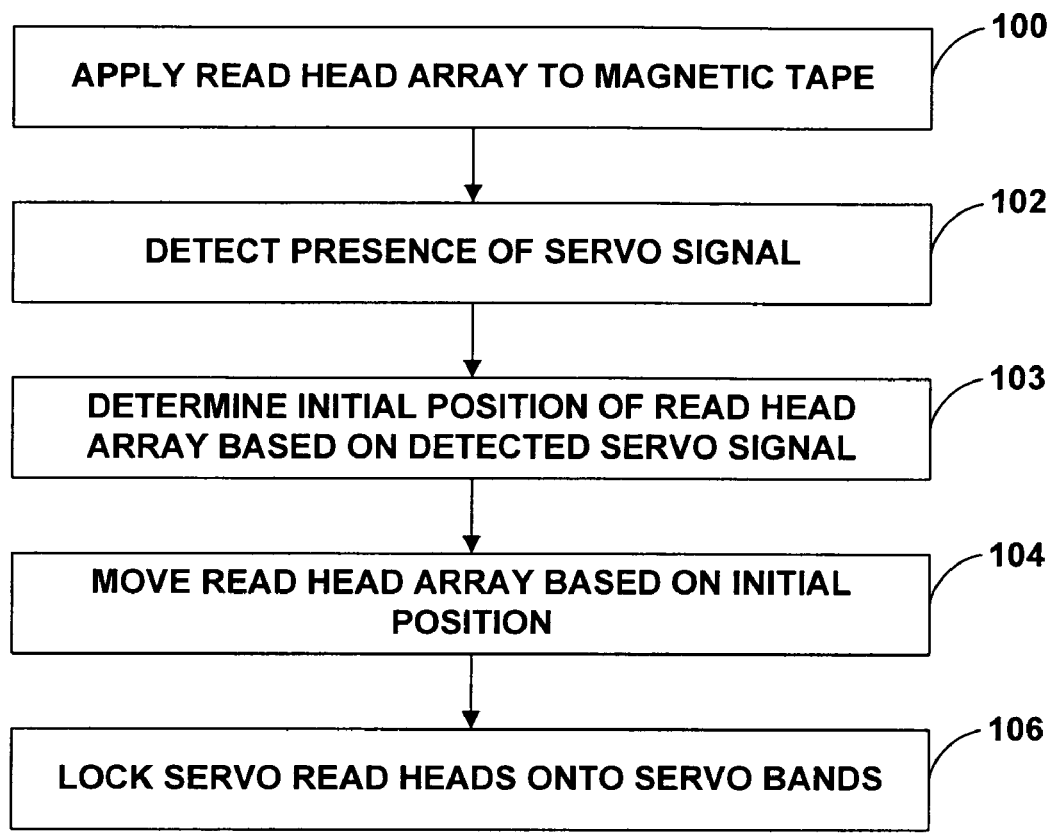
FIG. 10 is a flowchart illustrating a method of positioning a read head array adjacent a magnetic tape with distributed servo bands.

FIG. 10 is a flowchart illustrating a method of positioning a read head array adjacent a magnetic tape with distributed servo bands. The method will be described herein in reference to FIGS. 9A and 9B. Read head array 90 is applied to magnetic tape 80 at any position (100). The relatively narrow servo band widths on magnetic tape 80 are outside the mechanical tolerances of a read head system such that first and second servo read heads 92 and 94 cannot be initially located on servo bands 82 when read head array 90 is applied to magnetic tape 80.

In order to allow read head array 90 to be initially located at any position on the surface of magnetic tape 80, each of the data read heads on read head array 90 are capable of detecting a servo signal from servo bands 82. For example, after placing read head array 90 adjacent magnetic tape 80, data read head 96 detects a servo signal from a set of mixed frequency servo windows 86 on second servo band 82B (102).

A control unit coupled to read head array 90 receives the detected servo signal. The control unit determines that data read head 96 detected the servo signal. Then the control unit determines an initial position of read head array 90 relative second servo band 82B based on the detected servo signal (103). The control unit then moves read head array 90 to a desired position based on the initial position (104). For example, the control unit may calculate a distance between the initial position and the desired position and move read head array 90 based on the calculated distance.

Moving read head array 90 to the desired position aligns first servo read head 92 with second servo band 82B and aligns second servo read head 94 with third servo band 82C such that first servo read head 92 and second servo read head 94 can detect signals from the different servo bands, respectively. The control unit then locks the servo read heads 92, 94 onto the respective servo bands (106). In this way, each of the data read heads on read head array 90 aligns with one of the data tracks within second data band 84B positioned between second servo band 82B and third servo band 82C.

Various embodiments of the invention have been described. For example, a magnetic tape has been described that reduces a servo band pitch by distributing a plurality of servo bands across the magnetic tape. The reduced servo band pitch reduces the influence of media dimensional changes on data track alignment. In many cases, the servo bands comprise single track servo bands, although multi-track servo bands might also be used.

In addition, a read head system has been described that reads data recorded on a magnetic tape as described herein. The read head system comprises a read head array that may be initially positioned at any location on the magnetic tape. Each of the data read heads on the read head array is capable of detecting a servo signal from one of the servo bands. Based on the position of the data read head that detects the servo signal, the read head array is moved to align a first servo read head with a first servo band and a second servo read head with a second servo band such that each of the plurality of data read heads aligns with one of the plurality of data tracks positioned between the first and second servo bands on the magnetic tape. These and other embodiments are within the scope of the following claims.

The invention claimed is:

1. A magnetic tape medium comprising:
    a plurality of data bands that extend along a length of the magnetic tape medium, wherein the plurality of data bands are distributed across a width of the magnetic tape medium and wherein each of the data bands includes a plurality of data tracks; and
    a plurality of servo bands that extend along the length of the magnetic tape medium, wherein the plurality of servo bands are distributed across the width of the magnetic tape medium and wherein each of the servo bands separates two of the data bands,
    wherein each of the servo bands defines an amplitude-based servo pattern that defines a centerline and windows above and below the centerline,
    wherein each of the servo bands defines a servo band width that corresponds to a width of two of the data tracks within the data bands,
    wherein each of the servo bands provides positioning information, and a respective one of the servo bands provides positioning information for at least one of the data bands that is adjacent to the respective one of the servo bands,
    wherein distances between the servo bands across the width of the magnetic tape medium are less than 200 micrometers, and
    wherein widths of each of the servo bands across the width of the magnetic tape medium are less than 20 micrometers.

2. The magnetic tape medium of claim 1, wherein the widths of each of the servo bands across the width of the magnetic tape medium are less than 10 micrometers.

3. The magnetic tape medium of claim 1, wherein each of the plurality of data tracks is approximately 5 micrometers wide.

4. The magnetic tape medium of claim 3, wherein each of the plurality of data bands includes thirty-two data tracks.

5. The magnetic tape medium of claim 1, wherein the servo bands comprise magnetically recorded servo patterns.

6. The magnetic tape medium of claim 5, wherein the magnetically recorded servo patterns comprise single frequency amplitude-based servo patterns recorded in each of the servo bands, wherein the windows include erase windows where a recorded signal is erased above and below the centerline.

7. The magnetic tape medium of claim 6, wherein the magnetically recorded servo patterns define an overall amplitude-based pattern that is broken into different ones of the servo bands and distributed across the width of the magnetic tape medium.

8. The magnetic tape medium of claim 5, wherein the magnetically recorded servo patterns comprise mixed frequency amplitude-based servo patterns in each of the servo bands, wherein the windows include first windows recorded above and below the centerline at a first recorded frequency and second windows recorded above and below the centerline at a second recorded frequency.

9. The magnetic tape medium of claim 8, wherein the magnetically recorded servo patterns define an overall amplitude-based pattern that is broken into different ones of the servo bands and distributed across the width of the magnetic tape medium.

10. The magnetic tape medium of claim 1, wherein each of the servo bands defines an amplitude-based servo pattern that defines only one centerline.

\* \* \* \* \*